United States Patent

Hasler et al.

[11] Patent Number: 6,114,841
[45] Date of Patent: Sep. 5, 2000

[54] METHOD AND DEVICE FOR COMPENSATION OF REACTIVE POWER

[75] Inventors: Jean-Philippe Hasler, Vasteras; Thomas Johansson, Stockholm; Lennart Angquist, Enkoping, all of Sweden

[73] Assignee: Asea Brown Boveri AB, Vasteras, Sweden

[21] Appl. No.: 08/874,035

[22] Filed: Jun. 12, 1997

[30] Foreign Application Priority Data

Jun. 17, 1996 [SE] Sweden .................................. 9602368

[51] Int. Cl.[7] .................................................. G05F 1/70
[52] U.S. Cl. ............................................. 323/210; 323/207
[58] Field of Search ................................ 323/205, 207, 323/208, 209, 210

[56] References Cited

U.S. PATENT DOCUMENTS

| 4,174,497 | 11/1979 | Depenbrock | 323/119 |
|---|---|---|---|
| 4,780,660 | 10/1988 | Shima et al. | 323/207 |
| 5,138,247 | 8/1992 | Tanoue et al. | |
| 5,321,598 | 6/1994 | Moran | 363/41 |
| 5,734,256 | 3/1998 | Larsen et al. | 323/207 |

FOREIGN PATENT DOCUMENTS 0 260 504  3/1988  European Pat. Off. .
0 519 635  12/1992  European Pat. Off. .

*Primary Examiner*—Matthew Nguyen
*Attorney, Agent, or Firm*—Pollock, Vande Sande & Amernick

[57] ABSTRACT

A device for compensation of the reactive power consumption of an industrial load, preferably an electric arc furnace or a plant for rolling of metallic materials, supplied from a three-phase (a, b, c) electric ac network, comprises a first compensation device for controllable consumption of reactive power and a second compensation device for generation of reactive power. The first compensation device comprises an inductor connected in series with a semiconductor connection controllable in dependence on a control order ($\alpha$ref) supplied thereto. Control equipment is supplied with measured values of voltage (Ua, Ub, Uc) and current (Ia, Ib, Ic), respectively, at the load. The control equipment comprises devices for determination of the instantaneous consumption of active and reactive power by the load, and a control device which forms the control signal to the first compensation device in dependence on the consumption of reactive power and active power by the load.

22 Claims, 3 Drawing Sheets sumption lie within a frequency interval of typically 0–20 Hz, the corresponding voltage variations, so-called flicker, are observable and disturbing to the human eye in case of electric lighting supplied by the ac network.

METHOD AND DEVICE FOR COMPENSATION OF REACTIVE POWER

TECHNICAL FIELD

The present invention relates to method for compensation of the reactive power consumption of an industrial load. Preferably an electric arc or a plant for rolling of metallic material, is supplied from an electric ac network. A first compensation device for controllable consumption of reactive power is used, comprising an inductor series-connected to a semiconductor connection which is controllable in dependence on a control signal supplied thereto, and a second compensation device for generation of reactive power, both devices being connected to the electric power network in a parallel connection with the load. The invention includes an apparatus for carrying out the method.

The apparatus comprises a control device which forms the control signal to the first compensation signal in dependence on the consumption of reactive power and active power by the load.

BACKGROUND OF THE INVENTION

Industrial loads connected to electric ac networks, in particular arc furnaces but also, for example, rolling mills, influence the voltage of the ac network, above all by a greatly varying consumption of reactive power during operation. Especially when the variations in power consumption lie within a frequency interval of typically 0–20 Hz, the corresponding voltage variations, so-called flicker, are observable and disturbing to the human eye in case of electric lighting supplied by the ac network.

It is known, in connection with industrial loads of the above-mentioned kind, to connect in parallel therewith, that is, in a shunt connection to the ac network, static compensators for compensation of the reactive power consumption of the load. One type of such a compensator usually comprises a device for generating reactive power as well as a device for controllable consumption of reactive power, known within the art as a thyristor-controlled reactor (TCR). The device for generation of reactive power usually comprises one or more mutually parallel-connected filters, each essentially comprising an inductive element in series-connection with capacitive elements. The filters are tuned to chosen multiples of the nominal frequency of the ac network, for example to the 3rd, 4th and 5th tones, sometimes even to the 2nd and 7th tones. The device for controllable consumption of reactive power comprises an inductive element, an inductor, in series-connection with a controllable semiconductor valve. The controllable semiconductor valve comprises two controllable semiconductors, usually thyristors, in anti-parallel connection. By phase-angle control of the semiconductors, that is by controlling their turn-on angle relative to the phase position of the voltage of the ac network, the susceptance of the device and hence its consumption of reactive power can be controlled.

For a general description of thyristor-controlled reactors, reference is made to Åke Ekström: High Power Electronics HVDC and SVC, Stockholm June 1990, in particular to pages 1–32 to 1–33 and 10-8 to 10–12.

The compensator generates a reactive power equal to that generated by the device for generation of reactive power, reduced by the consumption in the thyristor-controlled reactor. By determining the instantaneous consumption of reactive power by the load and then controlling the power consumption of the thyristor-controlled reactor to such a value that, together with the consumption of the load, it corresponds to the reactive power generated by the device for generation of reactive power, the reactive power exchange with the ac network thereby becoming zero.

European patent EP 0 260 504 describes a circuit for compensation of reactive power comprising a compensator and a load of the above-mentioned kind. In addition thereto, this circuit comprises a self-commutated converter, controlled in pulse-width modulation in dependence on control signals generated in a control member, and connected to the ac network in parallel connection with the load and the thyristor-controlled reactor. The converter supplies to the ac network a reactive current for compensation of the active and reactive power consumed/generated by the load and the thyristor-controlled reactor. In an orthogonal two-phase system, in dependence on sensed three-phase currents and three-phase voltages, the control member calculates instantaneous values of the active and reactive power consumed/generated by the load and the thyristor-controlled reactor together.

The above-mentioned specification states that the voltage variations in the ac network are substantially determined by variations in the reactive power consumption of the load and that the voltage variations in dependence on its active power consumption may be neglected. The control signals to the converter are therefore formed only in dependence on variations in the consumption of reactive power by the load.

The method used in the above-mentioned patent for determining the instantaneous active and reactive power of the load in an orthogonal two-phase system is also applicable for control of a thyristor-controlled reactor. However, in this connection it has proved to be difficult, and in certain cases impossible, with the method for forming a control signal as stated in the above-mentioned patent, to meet the increasingly more stringent demands on allowable disturbances imposed by the operators of the ac networks.

SUMMARY OF THE INVENTION

The object of the invention is to provide a method of the kind stated in the introductory part of the description, by which the reduction of so-called flicker is improved, and a device for carrying out the method.

According to the invention, this is achieved in that the control signal for the thyristor-controlled reactor is formed in dependence on the consumption of active power by the load.

Advantageous improvements of the invention will become clear from the following description and claims.

Studies of compensators comprising thyristor-controlled reactors have shown that improvements of their ability to reduce flicker are achieved if their control signals are formed according to the invention.

BRIEF DESCRIPTION OF THE DRAWINGS

The invention will be described in greater detail by description of embodiments with reference to the accompanying drawings, wherein FIG. 1 schematically shows, as a single-line diagram, an ac network with an industrial load and a device according to the invention for compensation of the reactive power consumption of the load.

DETAILED DESCRIPTION OF THE PREFERRED EMBODIMENTS

The following description relates both to the method and the device. The device comprises calculating members, shown in the figures as block diagrams, and it should be understood that the input and output signals to the respective blocks may comprise signals or calculating values. Signal and calculating value are therefore used synonymously in the following.

In order not to burden the presentation with distinctions self-explanatory to one skilled in the art, generally the same designations are used for the currents, the voltages, and the powers which arise in the compensation device and the load for the measured values and signals/calculating values, corresponding to the above-mentioned quantities, which are supplied to and processed in the control device described in the following.

Figure 1:
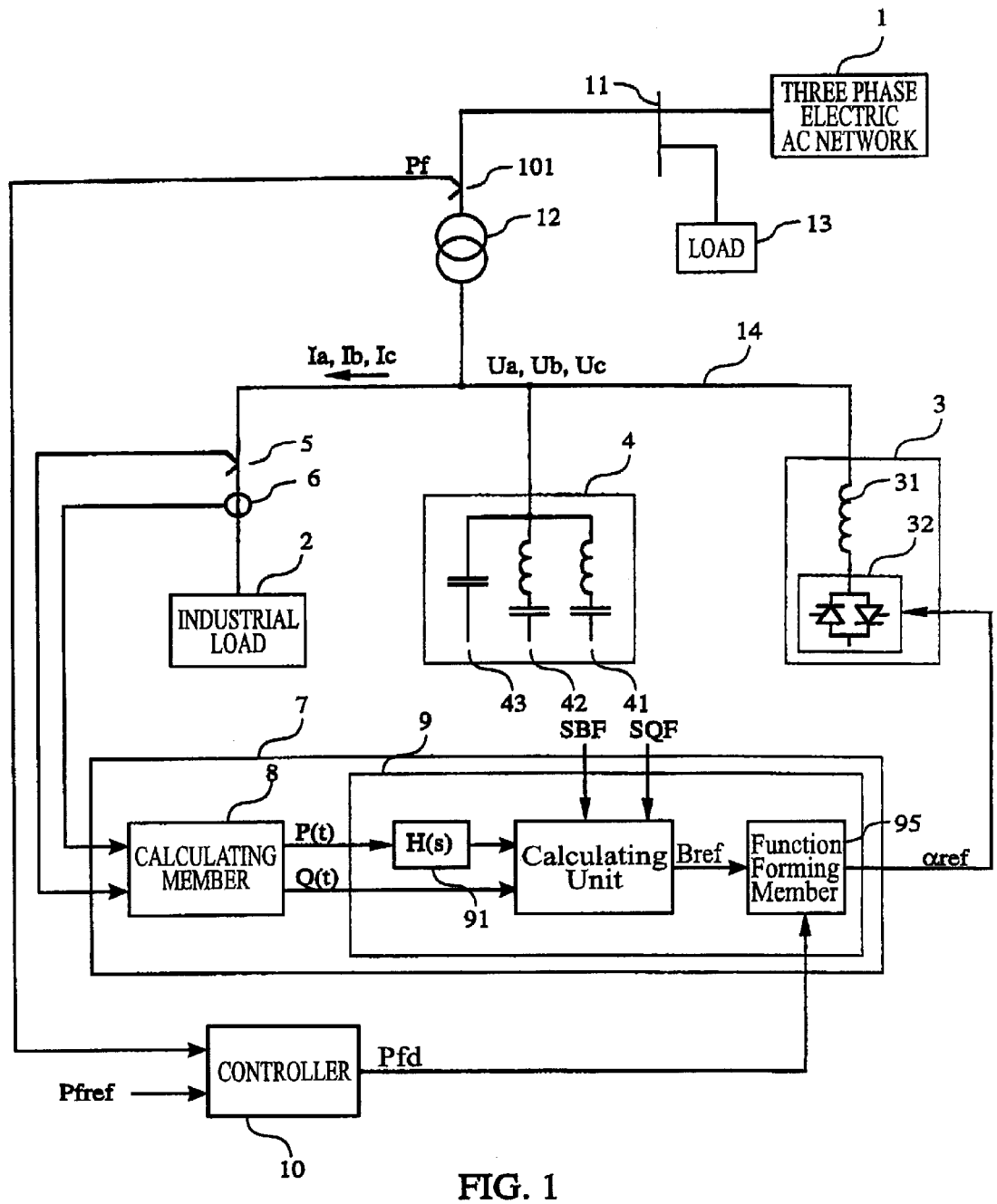

FIG. 1 shows, as a single-line diagram, a three-phase electric ac network 1 to which is connected an industrial load 2 in the form of an electric arc furnace. The arc furnace is connected to the ac network, via a transformer 12, at the busbar 11. Further, a general load 13 is connected to the busbar, which load may comprise, for example, lighting networks in dwellings or offices. In parallel with the arc furnace, at a busbar 14, a first compensation device 3 for controllable consumption of reactive power and a second compensation device 4 for generation of reactive power are connected.

The first compensation device comprises an inductor 31 connected in series with a controllable semiconductor connection 32, comprising two thyristors in anti-parallel connection. The susceptance of the compensation device, and hence its consumption of reactive power, are controllable in a known manner by phase-angle control of the thyristors, that is, by control of their turn-on angle relative to the phase position for the voltage of the ac network.

The first compensation device of course comprises one inductor and one semiconductor connection per phase and its three phases are usually mutually connected in a Δ connection.

The second compensation device comprises a number of mutually parallel-connected filters, each one being tuned, in a known manner, to resonance with a certain multiple, tone, of the nominal frequency of the ac network, for example its 3rd, 4th or 5th tone. For the sake of clarity, the figure only shows two filters 41 and 42, but it is to be understood that the second compensation device may comprise one or more filters of this type. Each of the filters essentially comprises an inductive element in series-connection with a capacitive element, and this capacitive element generates a certain reactive power. The arc furnace and the compensation device are dimensioned in such a way, with respect to reactive power, that the second compensation device generates power which, at least during normal operation, exceeds the reactive power consumption of the arc furnace. The first compensation device is controlled to consume power such that, together with the consumption of the load, it corresponds to reactive power generated by the first compensation device. Viewed towards the transformer 12, the reactive power consumption on the busbar 14 is then equal to zero. The second compensation device may also comprise a capacitor bank 43 in the event that the generation in the filters were insufficient.

The voltages and currents for the three phases on the busbar 14 are designated Ua, Ub, Uc and Ia, Ib, Ic, respectively. In some known manner, the voltages Ua, Ub, Uc are sensed by means of a voltage-measuring device 5 and the currents Ia, Ib, Ic by means of a current-measuring device 6. The sensed values are supplied as measured values to control equipment 7, which, in dependence thereon, forms a control order αref which is supplied to the semiconductor connection 32. The control equipment comprises a calculating member 8 which, in dependence on the measured values of sensed voltages and currents, forms calculating values of the instantaneous active power P(t) of the arc furnace and of its instantaneous reactive power Q(t), and further a control device 9 which, in dependence on the calculating values of these powers, forms the control order.

The calculating member 8 forms, in some known manner, the calculating values of active and reactive power on the basis of the following known equations for transformation from a three-phase system, the phases of which are designated a, b, c, to an orthogonal two-phase system, the phases of which are designated d and q, $$Ud+jUq=\bar{U}=\tfrac{2}{3}[Ua+Ub*e^{j2\pi/3}+Uc*e^{-j2\pi/3}] \quad (1)$$

$$Id+jIq=\bar{I}=\tfrac{2}{3}[Ia+Ib*e^{j2\pi/3}+Ic*e^{-j2\pi/3}] \quad (2)$$

$$P(t)=3/2Re[\bar{U}*\bar{I}*]=3/2[Ud*Id+Uq*Iq] \quad (3)$$

$$Q(t)=3/2Im[\bar{U}*\bar{I}*]=-3/2[Ud*Iq-Uq*Id] \quad (4)$$

where $\bar{I}*$ designates the conjugate of the current vector $\bar{I}$ and Re and Im designate the real part and the imaginary part, respectively, of the complex apparent power $[\bar{U}*\bar{I}*]$.

The equation (4) expresses the reactive instantaneous power consumption of the arc furnace and the task is to control the first compensation device to a reactive power consumption which together with the consumption of the arc furnace balances the power generated by the second compensation device. As mentioned above, the control of the first compensation device takes place by controlling its susceptance, here designated B. If the turn-on angle α of the thyristors is defined relative to the phase position for the zero crossing of the alternating voltage across the inductor, maximum susceptance (with negative signs), and hence maximum current through the inductor, is obtained for a=90°, and minimum susceptance (i.e. equal to zero) is obtained for a=180°. The susceptance value whose magnitude is maximal thus amounts to B=−1/ωL, where L designates the inductance of the inductor and ω is the angular frequency of the ac network.

Between susceptance B and turn-on angle α the following well-known relationship applies:

$$B(\alpha)=-[2(\pi-\alpha)+\sin 2\alpha]/\pi\omega L \quad (5)$$

and between the power Qr, consumed by the first compensation device, and its susceptance B, the following relationship applies:

$$Qr=-3/2*B*|\bar{U}|^2 \quad (6)$$

where $|\bar{U}|$ designates the magnitude of the voltage vector $\bar{U}=Ud+jUq$.

Figure 2A:
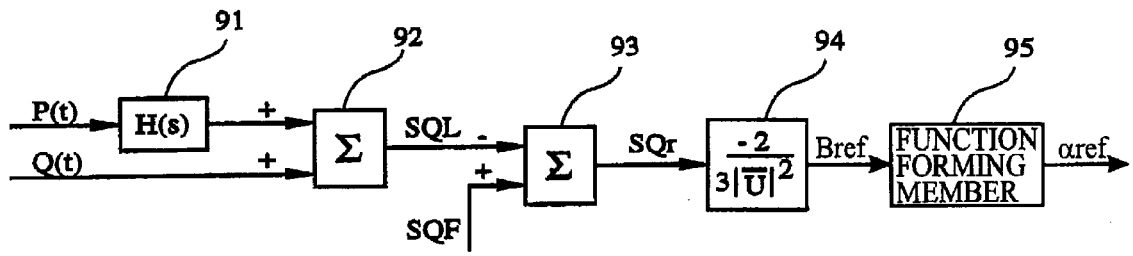
FIGS. 2A and 2b show embodiments of a control device in a device according to FIG. 1, FIG. 3 schematically shows, as a single-line diagram, another embodiment of an ac network with an industrial load and a device according to the invention for compensation of the reactive power consumption of the load.

FIG. 2A shows an embodiment of the control device 9 according to the invention. The control device comprises a signal-processing member 91, a summator 92, a summator 93, a quotient-forming member 94 and a function-forming member 95.

The output signal SQr from the summator 93 constitutes a calculating value of the reactive power which is to be consumed by the first compensation device and, according to the invention, this output signal is formed in dependence on, in addition to the reactive power Q(t) instantaneously consumed by the arc furnace, also in dependence on the active power P(t) instantaneously consumed by the arc furnace. This is achieved in the control device by supplying thereto values of the respective powers, calculated according to equations (3) and (4), whereupon a sum SQL is formed in the summator 92 in dependence on these values. The calculating value of the reactive power is supplied to the summator 92 whereas the calculating value of the active power is supplied to the signal-processing member 91, the output signal of which is supplied to the summator 92. The summator 93 forms the difference of a signal SQF, corresponding to the power QF generated by the second compensation device, and the signal SQL, which difference thus constitutes a calculating value SQr of the reactive power which is to be consumed by the first compensation device. By division of the calculating value SQr by the factor $-3/2*|\overline{U}|^2$ in the quotient-forming member 94, according to equation (6), a reference value Bref for the susceptance of the first compensation device is obtained. This reference value is supplied to the function-forming member 95, which forms the control order αref based on equation (5). It is assumed here that the power QF generated by the second compensation device is known as a function of the voltages Ua, Ub, Uc, for example from data for elements included in the device.

The signal-processing member 91 is arranged with a transfer function which makes the control device active in the frequency interval which is of interest for reduction of flicker. An interference curve specified in IEC Standard No. 868 (Flicker meter. Functional and design specifications), weighed in dependence on the frequency, exhibits a maximum at a frequency of about 8.8 Hz, and the control device should therefore advantageously be active in an interval around this frequency, preferably within a frequency interval of 2–25 Hz. The signal-processing member is therefore preferably given a phase-advancing (derivative) characteristic within this interval and its transfer function H(s) may advantageously comprise a term of the form $$H(s)=K(1+sT1)/(1+sT2) \quad (7)$$

where s is the Laplace operator, K an amplification factor, and T1 and T2, with T2<T1, time constants corresponding to the mentioned frequency interval.

Figure 2B:
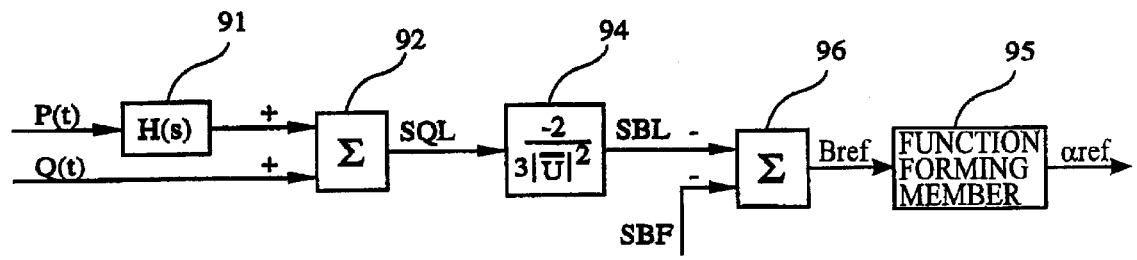

FIG. 2B shows an alternative embodiment of the control device for those cases where the susceptance BF for the second compensation device is known. The difference in relation to the embodiment described with reference to FIG. 2A is that the output signal SQL from the summator 92 is supplied to the quotient-forming member 94, which, by analogy with what has been described above, according to equation (6), forms a calculated susceptance value SBL for the arc furnace, corresponding to its instantaneous reactive power consumption. The calculated susceptance value SBL and a calculating value SBF of the susceptance of the second compensation device are each supplied to an individual sign-changing input of a summator 96, which forms the sum, with a negative sign, of the signals SBL and SBF. This sum constitutes the reference value Bref for the susceptance of the first compensation device, which reference value is supplied to the function-forming member 95.

Figure 3:
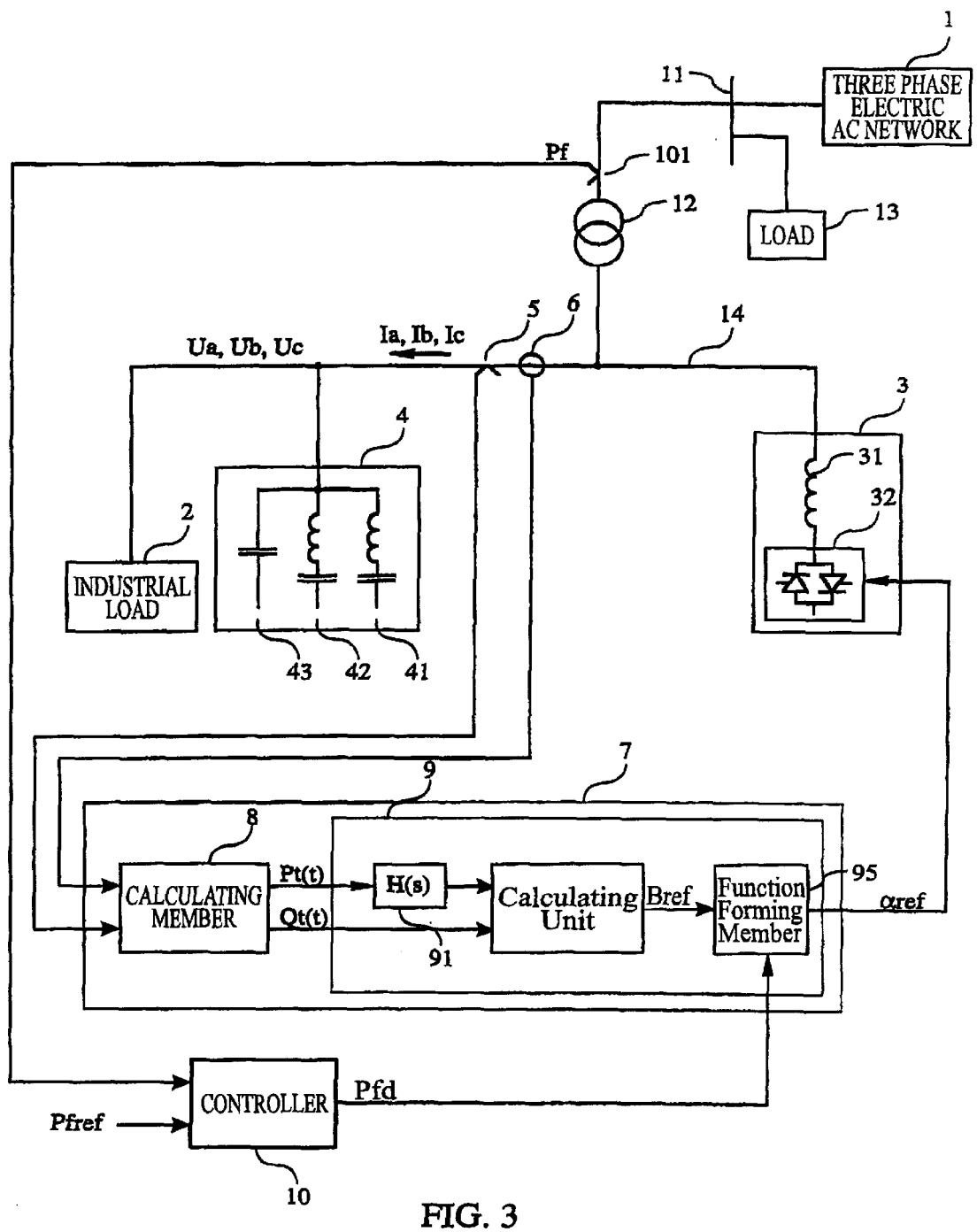

FIG. 3 shows an ac network with an industrial load and a device according to the invention of a kind similar to that in FIG. 1 and where corresponding parts of the figure have been given the same reference designations as in FIG. 1. The difference in relation to FIG. 1 is that in this case the currents Ia, Ib, Ic flowing to the parallel connection of the ac furnace and the second compensation device are sensed by means of the current-measuring devices 6. The calculating values of instantaneous active and instantaneous reactive power, formed by the calculating member 8, in this case thus consist of the total active power PT(t) and the total reactive power QT(t) of the mentioned parallel connection, that is, while assuming that the active power consumed in the second compensation device is negligible, with the previously used designations, P(t)=PT(t), whereas QT(t) with reversed sign thus constitutes the calculating value SQr of the reactive power which is to be consumed by the first compensation device.

Figure 4:
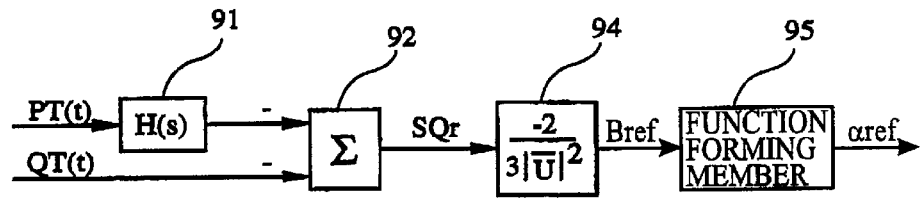
FIG. 4 shows an embodiment of a control device in a device according to FIG. 3.

In this case, the control device may be designed as illustrated in FIG. 4. The calculating value SQr, formed as a sum, with a negative sign, of the calculating value QT(t) and of the output signal from the signal-processing member 91, is supplied, as described with reference to FIG. 2A, to the quotient-forming member 94, the output signal of which constitutes a reference value Bref for the susceptance of the first compensation value. This reference value is supplied to the function-forming member 95.

The control device according to the invention, described above, is essentially active in the frequency range of interest with respect to flicker, that is, typically in the range of 2–25 Hz. As illustrated in FIGS. 1 and 3, the function-forming member 95 is usually also supplied, in a known manner, with a correction signal Pfd, formed in a controller 10. The power factor Pf for transformer, load and compensation device is sensed by means of a measuring member 101 on the primary side of the transformer 12 and the controller forms the correction signal Pfd in dependence on a comparison between the sensed value of the power factor and a prescribed reference value Pfref. The purpose of the controller 10 is to maintain for the connected equipment an average power factor according to agreement with the electric power supplier. This mean value is usually specified over periods of 10–30 minutes, and this controller is thus active in a considerably lower frequency range than the device according to the invention.

The blocks shown in the block diagrams may, in appropriate parts, be formed as a model comprising analog and/or digital means for the modelling, or be completely or partially carried out as calculations by means of analog and/or digital technique in hard wired circuits or be implemented as programs in a microprocessor.

The invention is not limited to the embodiments shown. Thus, within the scope of the invention, the calculating member 8 may be supplied only with sensed values of the currents Ia, Ib, Ic and carry out the transformation $\overline{I}=Id+jIq=2/3[Ia+Ib*e^{j2\pi/3}+Ic*e^{-j2\pi/3}]$ according to equation (2). The instantaneous calculating values P(t) and Q(t) (as well as PT(t) and QT(t)) described above are thus replaced by calculating values of the instantaneous currents Id and Iq, whereby the current Id is supplied to the signal-processing member 91, the output signal of which, together with the calculating value of the current Iq is summed into a current reference value IQr for the first compensation device. This current reference value can then be converted into a reference value for reactive power by multiplication in a multiplying member (not shown in the figures) by the magnitude $3/2*|\overline{U}|$ of the voltage vector $\overline{U}=Ud+jUq$, whereupon the rest of the signal processing may take place in a manner analogous to that described above.

As mentioned above, the first compensation device comprises one inductor and one semiconductor connection per phase and its three phases are usually interconnected in a Δ connection. The determination of the instantaneous consumption of active and reactive power by the load may therefore advantageously, in a known manner, be performed individually for each phase in a Δ connection equivalent for the load. Susceptance values are thereafter formed individually for each of the three phases of the first compensation device in accordance with the method according to the invention described above.

We claim:

1. A method for compensation of the reactive power consumption of an industrial load supplied from a three-phase (a, b, c) electric ac network, wherein a first compensation device for controllable consumption of reactive power and a second compensation device for generation of reactive power are both connected to the electric power network in a parallel connection with the load, and the first compensation device comprises an inductor connected in series with a semiconductor connection controllable with a control signal supplied thereto, said semiconductor connection comprising at least two controllable semiconductors in antiparallel connection, whereby the instantaneous consumption of active (P(t)) and of reactive power (Q(t)) by the load is determined, and the control signal to the first compensation device is formed in dependence on said instantaneous consumption of active and reactive power by the load, said method comprising the steps of:

forming a signal corresponding to said consumption of active power;

supplying said signal to a signal-processing member with a phase-advancing characteristic in a frequency interval surrounding the frequency 8.8 Hz, and forming the control signal in dependence on an output signal from said signal-processing member.

2. A method for compensation of the reactive power consumption of an industrial load supplied from a three-phase (a, b, c) electric ac network, wherein a first compensation device for controllable consumption of reactive power and a second compensation device for generation of reactive power are both connected to the electric power network in a parallel connection with the load, and the first compensation device comprises an inductor connected in series with a semiconductor connection controllable in dependence on a control order (αref) supplied thereto, said semiconductor connection comprising at least two controllable semiconductors in antiparallel connection, whereby the total instantaneous consumption of active power (P(t)) and reactive power (Q(t)) by the load and the second compensation device is determined, and the control signal to the first compensation device is formed in dependence on said instantaneous consumption of active and reactive power by the load and by the second compensation device said method comprising the steps of:

forming a signal corresponding to said total consumption of active power, supplying said signal to a signal-processing member with a phase-advancing characteristic in a frequency interval surrounding the frequency 8.8 Hz, preferably in a frequency interval of 2–25 Hz, and forming the control order in dependence on an output signal from said signal processing member.

3. A method according to claim 1, wherein said determination of instantaneous consumption of active and of reactive power comprises a transformation of values of current and voltages, sensed in a three-phase system (a, b, c), to an orthogonal two-phase system (d, q).

4. A method according to claim 1, wherein said determination of instantaneous consumption of active and reactive power is performed individually for each of the phases in an equivalent Δ connection and the control signal is formed individually for each of the phases of the first compensation device in dependence on active and reactive power for the respective phase.

5. A device for compensation of the reactive power consumption of an industrial load supplied from a three-phase (a, b, c) electric ac network, said device comprising:

a first compensation device for controllable consumption of reactive power, a second compensation device for generation of reactive power, voltage measuring devices and current-measuring devices for sensing voltages (Ua, Ub, Uc) and currents (Ia, Ib, Ic), respectively, at the load, and control equipment which is supplied with measured values of said sensed voltages and currents, said compensation devices being both connected to the electric power network in a parallel connection with the load, the first compensation device comprising an inductor connected in series with a semiconductor connection controllable in dependence on a control signal (αref) supplied thereto, said semiconductor connection comprising at least two controllable semiconductors in anti-parallel connection, the control equipment comprising means for determination of the instantaneous consumption of active (P(t)) and reactive power (Q(t)) by the load, and a control device which forms the control signal to the first compensation device in dependence on said instantaneous consumption of active and reactive power by the load, wherein the control device comprises a signal-processing member with a phase-advancing characteristic in a frequency interval surrounding the frequency 8.8 Hz which member is supplied with a signal corresponding to said consumption of active power, and the control device forms the control signal in dependence on an output signal from said signal processing member.

6. A device for compensation of the reactive power consumption of an industrial load supplied from a three-phase (a, b, c) electric ac network, said device comprising a first compensation device for controllable consumption of reactive power and a second compensation device for generation of reactive power, said compensation devices being both connected to the electric power network in a parallel connection with the load, voltage-measuring devices for sensing voltage (Ua, Ub, Uc) at the load and current-measuring devices for sensing current (Ia, Ib, Ic) flowing to the parallel connection of the load and the second compensation device, and control equipment which is supplied with measured values of said sensed voltages and currents, the first compensation device comprising an inductor connected in series with a semiconductor connection controllable in dependence on a control signal (αref) supplied thereto, said semiconductor connection comprising at least two controllable semiconductors in anti-parallel connection, the control equipment comprising means for determination of the total instantaneous consumption of active power (P(t)) and reactive power (Q(t)) by the load and the second compensation device, and a control device which forms the control signal to the first compensation device in dependence on said instantaneous consumption of active and reactive power by the load and by the second compensation device, wherein the control device comprises a signal-processing member with a phase advancing characteristic in a frequency interval surrounding the frequency 8.8 Hz, preferably in a frequency interval of 2–25 Hz which member is supplied with a signal corresponding to said total consumption of active power, and the control device forms the control order in dependence on an output signal from said signal-processing member.

7. A device according to claim 5, wherein the transfer function (H(s)) of said signal-processing member comprises a term of the form H(s)=K(1+sT1)/(1+sT2), where s is the Laplace operator, K an amplification factor and T1 and T2, with T2<T1, time constants corresponding to said frequency interval.

8. A device according to claim 5, wherein the means for determination of said instantaneous consumption of active and of reactive power during this determination carry out a transformation of values of current and voltages, sensed in a three-phase system (a, b, c), to an orthogonal two-phase system (d, q).

9. A device according to claim 5, wherein the means for determination of said instantaneous consumption of active and reactive power carry out this determination individually for each one of the phases in an equivalent Δ connection and wherein the control equipment forms the control order individually for each of the phases of the first compensation in dependence on active and reactive power for the respective phase.

10. A device for compensation of the reactive power consumption of an industrial load supplied from a three-phase electric AC network, said device comprising:

a first compensation member which controls consumption of reactive power based on a control signal;

a second compensation member, connected to said first compensation member, which generates reactive power, said first and second compensation members being connected in a parallel connection with said load;

a voltage measuring device arranged to measure voltages of said load;

a current measuring device arranged to measure currents of said load;

control equipment which communicates with said voltage and current measuring devices to receive said measured voltages and currents, said control equipment determining instantaneous active and reactive power based on said measured voltages and currents and calculating said control signal αref based upon said active and reactive powers, said control equipment communicating said control signal to said first compensation member.

11. The device according to claim 10 wherein said current measuring device measures currents flowing to the parallel connection of the load and said second compensation device.

12. The device according to claim 10 wherein said first compensation member comprises an inductor connected in series with a semi-conductor connection, said semiconductor connection being controllable based on said control signal.

13. The device according to claim 12 wherein said semiconductor connection comprises at least two controllable semiconductors in antiparallel connection.

14. The device according to claim 10 wherein said control equipment comprises means for determining said instantaneous consumption of active and reactive power and a control device which forms said control signal based on said instantaneous consumption of active and reactive power.

15. The device according to claim 14 wherein said control device comprises a signal-processing member with a phase advancing characteristic in a pre-determined frequency range, said signal-processing member being supplied with a signal corresponding to said consumption of active power, said control device forming said control signal dependent on an output signal β ref from said signal-processing member.

16. A method for compensation of the reactive power consumption of an industrial load supplied from a three-phase electric AC network comprising the steps of:

connecting a first compensation device for controlling reactive power and a second compensation device for generation of reactive power in parallel to said electric network;

calculating instantaneous consumption of active and reactive power in said load;

determining a control signal dependent on said power consumption;

supplying said control signal to said first compensation device whereby said first compensation device controls said reactive power dependent thereon.

17. The method of claim 16 wherein the step of determining said control signal comprises:

supplying a signal processing member with a signal corresponding to active power consumption, said signal processing member having a phase advancing characteristic in a pre-determined range; and forming said control signal dependent on an output from said signal processing member.

18. The method of claim 16 wherein the step of calculating said instantaneous power consumptions comprises the step of transforming current and voltages sensed in a three-phase system to an orthogonal two-phase system.

19. The method of claim 16 wherein the step of calculating said instantaneous power consumptions comprises the steps of:

determining said instantaneous active and reactive power consumption individually for each one of the phases in an equivalent Δ connection; and forming said control order individually for each of the phases of said first compensation member dependent on said active and reactive power for each respective phase.

20. A method for compensation of the reactive power consumption of an industrial load supplied from a three-phase electric AC network comprising the steps of:

connecting a first compensation device for controlling reactive power and a second compensation device for generation of reactive power in parallel to said electric network;

calculating total instantaneous consumption of active power and of reactive power in said load and said second compensation device;

determining a control signal dependent on said power consumption;

supplying said control signal to said first compensation member whereby said first compensation member controls reactive power dependent thereon.

21. The method according to claim 1 wherein said frequency interval is about 2–25 Hz.

22. The device according to claim 5 wherein said frequency interval is about 2–25 Hz.

* * * * *